United States Patent [19]

McCallum, III et al.

[11] Patent Number: 5,294,689

[45] Date of Patent: Mar. 15, 1994

[54] AQUEOUS PROCESS FOR PREPARING WATER-SOLUBLE ADDITION COPOLYMERS OF CYCLOHEXENE ANHYDRIDES

[75] Inventors: Thomas F. McCallum, III, Philadelphia; Barry Weinstein, Dresher, both of Pa.

[73] Assignee: Rohm and Haas Company, Philadelphia, Pa.

[21] Appl. No.: 3,374

[22] Filed: Jan. 12, 1993

[51] Int. Cl.$^5$ .................. C08F 222/04; C08F 230/04; C08F 222/02

[52] U.S. Cl. ...................... 526/271; 526/240; 526/318.2

[58] Field of Search ............. 526/271, 240, 318.2

[56] References Cited

U.S. PATENT DOCUMENTS

| | | | |
|---|---|---|---|
| 2,359,038 | 2/1944 | Hopff et al. | 260/78 |
| 2,421,876 | 6/1947 | Gerhart | 260/42 |
| 2,479,846 | 8/1949 | Gerhart | 260/45.4 |
| 2,537,845 | 1/1951 | Morris et al. | 260/468 |
| 2,560,119 | 7/1951 | McCaslin et al. | 260/78.4 |
| 3,838,113 | 9/1974 | Smallman | 526/271 |
| 4,126,738 | 11/1978 | Gaylord | 526/271 |
| 4,202,955 | 5/1980 | Gaylord | 526/272 |

OTHER PUBLICATIONS

U.S.S.R. Inventors Certificate SU891,707, Published Dec. 23, 1981.

*Primary Examiner*—Joseph L. Schofer
*Assistant Examiner*—Wu C. Cheng
*Attorney, Agent, or Firm*—David T. Banchik

[57] ABSTRACT

The present invention provides an aqueous process for preparing water-soluble addition copolymers of containing, as polymerized units: (a) from about 3 to about 95 percent by weight of one or more cyclohexene anhydrides or the alkali metal or ammonium salts thereof, and (b) from about 5 to about 97 percent by weight of one or more monomers $C_4$-$C_6$ monoethylenically unsaturated dicarboxylic acids and the alkali metal and ammonium salts thereof. These copolymers are useful as water-treatment additives for boiler waters and cooling towers and as detergent additives acting as builders, anti-filming agents, dispersants, sequestering agents and encrustation inhibitors.

9 Claims, No Drawings

AQUEOUS PROCESS FOR PREPARING WATER-SOLUBLE ADDITION COPOLYMERS OF CYCLOHEXENE ANHYDRIDES

This invention relates to an aqueous process for preparing water-soluble addition copolymers of cyclohexene anhydrides. In particular, this invention relates to an aqueous process for preparing water-soluble addition copolymers of cyclohexene anhydrides with one or more monoethylenically unsaturated dicarboxylic acid monomers.

Cyclohexene anhydrides are monoethylenically unsaturated six-membered rings with anhydride functionality attached to the ring. For example, 1,2,3,6-cis-tetrahydrophthalic anhydride is a cyclohexene anhydride with the following structure:

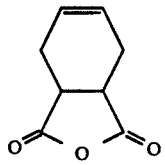

Cyclohexene anhydrides are commonly prepared by Diels-Alder processes. For example, 1,2,3,6-cis-tetrahydrophthalic anhydride can be prepared by a Diels-Alder reaction between butadiene and maleic anhydride. 5-Norbornene-2,3-dicarboxylic acid anhydride can be prepared from maleic anhydride and cyclopentadiene. Other cyclohexene anhydrides can be made by using substituted analogs of either the diene or anhydride.

Cyclohexene anhydrides can be used as a monomer in either of two ways: 1) to produce condensation polymers by reacting the carboxyl groups of the cyclohexene anhydrides with reactive moieties such as hydroxyls to form polyesters, or 2) to produce addition polymers by free-radical polymerization at the site of ethylenic unsaturation.

Water-soluble addition polymers and copolymers are useful as water-treatment additives for boiler waters and cooling towers and as detergent and cleaner additives acting as builders, anti-filming agents, dispersants, sequestering agents and encrustation inhibitors.

Addition copolymers have been prepared by reacting equimolar amounts of maleic anhydride and tetrahydrophthalic anhydride by processes using molten reactants as the reaction medium, or by processes employing organic solvents such as methyl ethyl ketone, toluene and diethyl benzene.

Addition copolymers of maleic anhydride and endo-cis-5-norbornene-2,3-dicarboxylic anhydride have been prepared by processes employing no solvent, or employing inert organic solvents.

The present invention seeks to provide an aqueous process for preparing water-soluble addition copolymers of cyclohexene anhydrides.

According to the present invention there is provided an aqueous process for preparing water-soluble polymers comprising: polymerizing a monomer mixture in the presence of water and one or more polymerization initiators at an elevated temperature, wherein the monomer mixture comprises (a) from about 3 to about 95 percent by weight of one or more cyclohexene anhydrides or the alkali metal or ammonium salts thereof; and
(b) from about 5 to about 97 percent by weight of one or more monomers selected from the group consisting of $C_4$–$C_6$ monoethylenically unsaturated dicarboxylic acids and the alkali metal and ammonium salts thereof, and the anhydrides of the cis-dicarboxylic acids.

The water-soluble polymers prepared by the process of the present invention are useful as water-treatment additives for boiler waters and cooling towers, as additives to cleaning formulations, as mineral dispersants, and as additives to automatic machine-dishwashing detergents and to laundry detergents acting as builders, anti-filming agents, dispersants, sequestering agents and encrustation inhibitors.

The process of the present invention produces polymers which contain, as polymerized units, from about 3 to about 95 percent by weight of one or more cyclohexene anhydrides or the alkali metal or ammonium salts thereof. Cyclohexene anhydrides are monoethylenically unsaturated six-membered rings with anhydride functionality attached to the ring. The simplest cyclohexene anhydride is 1,2,3,6-tetrahydrophthalic anhydride which has the following structure:

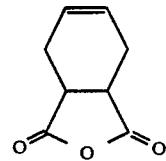

Other suitable cyclohexene anhydrides have alkyl substituents of from one to four carbon atoms attached to any of the carbons of the cyclohexene ring. Still other suitable cyclohexene anhydrides are those wherein the cyclohexene ring is part of a bicyclic structure. In a bicyclic cyclohexene anhydride structure, the other ring may be formed by the presence of an oxygen atom, a methylene group or an ethylene group which is attached to two distinct carbon atoms of the cyclohexene ring. Examples of cyclohexene anhydrides include 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, and 2-methyl-1,3,6-tetrahydrophthalic anhydride. Preferably, the cyclohexene anhydride is 1,2,3,6-cis-tetrahydrophthalic anhydride (THPA), which, when hydrolysed is referred to as cyclohexene dicarboxylic acid (CDC). CDC and the alkali metal salts of CDC are the most preferred cyclohexene anhydride, although combinations of cyclohexene anhydrides can be used.

The process of the present invention can be used to produce polymers wherein the cyclohexene anhydride is present at a level of from about 3 to about 95 percent by weight. The preferred level of cyclohexene anhydride varies and is dependent on the balance of properties needed in the particular application. Higher amounts of cyclohexene anhydride may be desirable, for example, to enhance the salt tolerance of the resulting polymer. Thus, polymers containing high levels of cyclohexene anhydride are compatible in brine solutions, basic solutions and calcium containing solutions.

Lower levels of cyclohexene anhydride may be desirable, for example, to enhance the ability of the polymer to sequester calcium, thereby improving the detergency properties of the polymer. Preferably, the process of the present invention produces polymers which contain, as polymerized units, one or more cyclohexene anhydrides or alkali metal or ammonium salts thereof at a level of from about 5 to about 90, and most preferably from about 10 to about 85 percent by weight of the polymer.

The process of the present invention produces polymers which contain one or more monoethylenically unsaturated monomers selected from the group of $C_4$-$C_6$ monoethylenically unsaturated dicarboxylic acids and the alkali metal and ammonium salts thereof, and the anhydrides of the cis-dicarboxylic acids including maleic acid, maleic anhydride, itaconic acid, mesaconic acid, fumaric acid and citraconic acid. Most preferably, the monoethylenically unsaturated monomer is maleic anhydride, maleic acid or itaconic acid or salts thereof. The process of the present invention produces polymers which contain, as polymerized units, these monoethylenically unsaturated monomers at levels of from 5 to about 97 percent by weight, preferably from 10 to 95 percent and most preferably from 15 to 90 percent by weight.

The process of the present invention can be conducted as a cofeed, heel, semi-continuous or continuous process. Preferably, the process is conducted as a heel process wherein most, or all, of the monomers are present in the reactor and most or all of the initiators are fed into the reactor over time. Generally, the feeds are conducted for from 5 minutes to 5 hours, preferably from 30 minutes to 4 hours, and most preferably from 1 hour to 3 hours.

Other optional components of the reaction mixture, such as neutralizer solutions, chain regulators, and metals, may present in the reactor before the initiator is fed, or they can be fed into the reaction mixture as separate streams or combined with one or more of the other feed streams. When the process of the present invention is run as a heel process, it is preferred that the initiator, and any other component which is being fed into the reactor, are introduced into the reaction mixture as separate streams which are fed linearly (i.e. at constant rates). Preferably, the optional components are present in the heel. If desired, the streams can be staggered so that one or more of the streams are completed before the others.

The processes of the present invention is an aqueous processes, substantially free of organic solvents. The water may be introduced into the reaction mixture initially, as a separate feed, as the solvent for one or more of the other components of the reaction mixture or some combination thereof. Generally, the polymerizations have a final solids levels in the range of from about 20 percent to about 80 percent by weight of the reaction mixture, preferably in the range of from about 30 to about 70 percent by weight, and most preferably from about 40 to about 70 percent by weight of the reaction mixture.

The temperature of the polymerization reaction will depend on the choice of initiator, and target molecular weight. Generally, the temperature of the polymerization is up to the boiling point of the system although the polymerization can be conducted under pressure if higher temperatures are used. Preferably, the temperature of the polymerization is from about 25° to about 110° C. and most preferably from about 40° to about 105° C.

Suitable initiators for the process of the present invention are any conventional water-soluble initiators. One class of suitable initiators are free-radical initiators such as hydrogen peroxide, certain alkyl hydroperoxides, dialkyl peroxides, persulfates, peresters, percarbonates, ketone peroxides and azo initiators. Specific examples of suitable free-radical initiators include hydrogen peroxide, t-butyl hydroperoxide, ammonium persulfate, potassium persulfate, sodium persulfate, tertiary-amyl hydroperoxide and methylethyl ketone peroxide. The free-radical initiators are typically used in amounts of from about 1 percent to about 50 percent based on the total monomer weight. The amount of initiator used will vary according to the desired molecular weight of the resulting polymer and the relative amount of cyclohexene anhydride.

Water-soluble redox initiators may also be used. These initiators include, but are not limited to, sodium bisulfite, sodium sulfite, persulfates, hypophosphites, isoascorbic acid, sodium formaldehyde-sulfoxylate and the like, used with suitable oxidizing agents, such as the thermal initiators noted above. The redox initiators are typically used in amounts of from about 0.05 percent to about 10 percent, based on the weight of total monomer. A preferred range is from about 0.5 to about 5 percent by weight of total monomer. Combinations of initiators can also be used. A preferred method for making the polymers of the present invention uses both a free-radical initiator and a redox initiator. A particularly preferred combination of initiators is persulfate and peroxide.

In one embodiment of the present invention one or more water-soluble metal salts may be used to promote polymerization and to control the molecular weight of the resulting polymers. Water-soluble metal salts such as the salts of copper, iron, cobalt and manganese, are preferably used at levels of from about 1 to 200 parts per million (ppm) of the metal ion, based on the weight of polymerizable monomers, and more preferably from about 5 to 100 ppm. The preferred metal salts are the copper salts and iron salts, which include all inorganic and organic compounds that will generate copper or iron ions in aqueous solution. Suitable salts include sulfates, nitrates, chlorides, and acetates and glutonates.

It is generally desirable to control the pH of the polymerizing monomer mixture especially when using thermal initiators such as persulfate salts, whether alone or in combination with peroxides such as, for example, hydrogen peroxide. The pH of the polymerizing monomer mixture can be controlled by a buffer system or by the addition of a suitable acid or base and is preferably designed to maintain the pH of the system from between about 3 and about 8, and most preferably from between about 4 and about 6.5. The pH of the system can be adjusted to suit the choice of the redox couple by the addition of a suitable acid or base. Examples of suitable neutralizers include sodium, potassium or ammonium hydroxide or amines, such as, triethanolamine. These neutralizers are preferably used as aqueous solutions and are preferably present in the reactor at the beginning of the process; however, the neutralizers can be gradually added into the reaction mixture as a separate stream or as part of one of the other streams. Typical levels of neutralizers are from 20 to 95 equivalent % of base, more preferably from 20 to 80 equivalent % of base, based on the total acid functionality of the monomer components.

The process of the present invention generally results in good conversion of the monomers into polymer product. However, if residual monomer levels in the polymer mixture are undesirably high for a particular application, their levels can be reduced by any of several techniques.

One common method for reducing the level of residual monomer in a polymer mixture is post-polymerization addition of one or more initiators or reducing agents which can assist scavenging of unreacted monomer.

Preferably, any post-polymerization additions of initiators or reducing agents are conducted at or below the polymerization temperature. The initiators and reducing agents suitable for reducing the residual monomer content of polymer mixtures are well known to those skilled in the art. Generally, any of the initiators suitable for the polymerization are also suitable for reducing the residual monomer content of the polymer mixture.

The level of initiators or reducing agents added as a means for reducing the residual monomer content of the polymer mixture should be as low as possible to minimize contamination of the product. Generally, the level of initiator or reducing agent added to reduce the residual monomer content of the polymer mixture is in the range of from about 0.1 to about 5.0, and preferably from about 0.5 to about 3.5 mole percent based on the total amount of polymerizable monomer.

The polymers produced by the process of the present invention are water-soluble. The water-solubility is affected by the molecular weight of the polymers and the relative amounts, and the hydrophilicity, of the monomer components incorporated into the polymer. If desired, chain regulators or chain transfer agents may be employed to assist in controlling the molecular weight of the polymers. Any conventional water-soluble chain regulator or chain transfer agent can be used. Suitable chain regulators include, but are not limited to, mercaptans, hypophosphites, alcohols and bisulfites. If used, mercaptans, such as 2-mercaptoethanol, or bisulfites, such as sodium metabisulfite, are preferred. Generally, the weight average molecular weights ($M_W$) of the polymers produced by the process of the present invention are from about 300 to about 500,000 preferably from about 500 to about 250,000 and most preferably from about 1,000 to about 100,000.

EXAMPLE 1

To a one liter, 4-neck flask equipped with a mechanical stirrer, reflux condenser, thermometer, and inlets for the gradual addition of monomer and initiator solution was added 47.5 grams of deionized water, 212.5 grams of maleic acid, 33.56 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 180.6 grams of 50% by weight aqueous sodium hydroxide. The contents of the flask were heated to 100° C. An initiator solution of 20.0 grams of sodium persulfate, 8.0 grams of deionized water and 75.0 grams of 50% by weight aqueous hydrogen peroxide was prepared. 9.5 grams of the initiator solution and 3.0 grams of 50% by weight aqueous hydrogen peroxide were added to the flask. After the exotherm subsided, the remainder of the initiator solution was added to the flask linearly while stirring over two hours and thirty minutes. Once the addition was complete, the system was kept at 100° C. for 30 minutes. The system was cooled to 80° C. and 27.0 grams of 35% by weight aqueous sodium metabisulfite was added. The system was then cooled to 60° C.

The resultant polymer solution had a solids content of 54.0%. Based on gel permeation chromatography (GPC), the Mw was 1890 and the number average molecular weight (Mn) was 1760. The residual maleic acid content was 168 ppm and the residual cis-1,2,3,6-tetrahydrophthalic anhydride was 9 ppm.

EXAMPLE 2

The same procedure was followed as Example 1 except: to the flask was initially added 50.0 grams of deionized water, 200.1 grams of maleic acid, 44.7 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 177.5 grams of 50% by weight aqueous sodium hydroxide; the initiator solution was prepared from 20.0 grams of sodium persulfate, 14.5 grams of deionized water and 75.0 grams of 50% by weight aqueous hydrogen peroxide; and 32.5 grams of 23% by weight aqueous sodium metabisulfite were used.

The resultant polymer solution had a pH of 4.8 and a solids content of 51.2%. Based on GPC, the Mw was 1810 and the Mn was 1680. The residual maleic acid content was 142 ppm and no residual cis-1,2,3,6-tetrahydrophthalic anhydride was detected.

EXAMPLE 3

The same procedure was followed as Example 1 except: to the flask was initially added 72.2 grams of deionized water, 175.0 grams of maleic acid, 67.5 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 140.35 grams of 50% by weight aqueous sodium hydroxide; the initiator solution was prepared from 20.0 grams of sodium persulfate, 10.5 grams of deionized water and 75.0 grams of 50% by weight aqueous hydrogen peroxide; 10.5 grams of the initiator solution and 3.0 grams of 50% by weight aqueous hydrogen peroxide were added to the flask; and 32.5 grams of 23% by weight aqueous sodium metabisulfite were used.

The resultant polymer solution had a pH of 4.7 and a solids content of 50.9%. Based on GPC, the Mw was 1520 and the Mn was 1380. The residual maleic acid content was 148 ppm and no residual cis-1,2,3,6-tetrahydrophthalic anhydride was detected.

EXAMPLE 4

The same procedure was followed as Example 1 except: to the flask was initially added 77.8 grams of deionized water, 175.0 grams of maleic acid, 67.6 grams of 5-norbornene-2,3-dicarboxylic anhydride, 6.0 grams of a 0.15% aqueous ferrous sulfate heptahydrate solution, 1.3 grams of a 0.15% aqueous copper sulfate pentahydrate solution and 138.2 grams of 50% by weight aqueous sodium hydroxide; the initiator solution was prepared from 20.0 grams of sodium persulfate, 9.5 grams of deionized water and 75.0 grams of 50% by weight aqueous hydrogen peroxide; and 27.5 grams of 27% by weight aqueous sodium metabisulfite were used.

The resultant polymer solution had a pH of 5.1 and a solids content of 51.4%. Based on GPC, the Mw was 1660 and the Mn was 1520. The residual maleic acid content was 5300 ppm and the residual 5-norbornene-2,3-dicarboxylic anhydride was 3000 ppm.

EXAMPLE 5

The same procedure was followed as Example 1 except: to the flask was initially added 75.0 grams of deionized water, 162.5 grams of maleic acid, 78.2 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 138.00 grams of 50% by weight aqueous sodium hydroxide; the initiator solution was prepared from 20.0 grams of sodium persulfate, 8.6 grams of deionized water and 75.0 grams of 50% by weight aqueous hydrogen peroxide; and 32.5 grams of 23% by weight aqueous sodium metabisulfite were used.

The resultant polymer solution had a pH of 4.8 and a solids content of 51.9%. Based on GPC, the Mw was 1270 and the Mn was 1160. The residual maleic acid content was 208 ppm and no residual cis-1,2,3,6-tetrahydrophthalic anhydride was detected.

EXAMPLE 6

The same procedure was followed as Example 1 except: to the flask was initially added 65.0 grams of deionized water, 150.0 grams of maleic acid, 89.9 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 135.40 grams of 50% by weight aqueous sodium hydroxide; the initiator solution was prepared from 20.0 grams of sodium persulfate, 10.7 grams of deionized water and 75.0 grams of 50% by weight aqueous hydrogen peroxide; 10.0 grams of the initiator solution and 3.0 grams of 50% by weight aqueous hydrogen peroxide were added to the flask; and 32.5 grams of 23% by weight aqueous sodium metabisulfite were used.

The resultant polymer solution had a pH of 4.3 and a solids content of 53.3%. Based on GPC, the Mw was 1220 and the Mn was 1020. The residual maleic acid content was 322 ppm and no residual cis-1,2,3,6-tetrahydrophthalic anhydride was detected.

EXAMPLE 7

The same procedure was followed as Example 1 except: to the flask was initially added 98.3 grams of deionized water, 126.8 grams of maleic anhydride, 90.12 grams of 5-norbornene-2,3-dicarboxylic anhydride, 6.0 grams of a 0.15% aqueous ferrous sulfate heptahydrate solution, 1.3 grams of a 0.15% aqueous copper sulfate pentahydrate solution and 132.60 grams of 50% by weight aqueous sodium hydroxide; the initiator solution was prepared from 20.0 grams of sodium persulfate, 9.5 grams of deionized water and 75.0 grams of 50% by weight aqueous hydrogen peroxide; and 27.5 grams of 27% by weight aqueous sodium metabisulfite were used.

The resultant polymer solution had a pH of 4.7 and a solids content of 52.7%. Based on GPC, the Mw was 1320 and the Mn was 1220. The residual maleic acid content was 5900 ppm and no residual 5-norbornene-2,3-dicarboxylic anhydride was detected.

EXAMPLE 8

The same procedure was followed as Example 1 except: to the flask was initially added 75.0 grams of deionized water, 175.0 grams of maleic acid, 67.75 grams of 3,6-epoxy-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 137.9 grams of 50% by weight aqueous sodium hydroxide; the initiator solution was prepared from 20.0 grams of sodium persulfate, 9.8 grams of deionized water and 75.0 grams of 50% by weight aqueous hydrogen peroxide; and 27.5 grams of 27% by weight aqueous sodium metabisulfite were used.

The resultant polymer solution had a pH of 5.0 and a solids content of 46.9%. Based on GPC, the Mw was 1620 and the Mn was 1470. The residual maleic acid content was 3700 ppm and the residual 3,6-epoxy-1,2,3,6-tetrahydrophthalic anhydride was 2800 ppm.

EXAMPLE 9

The same procedure was followed as Example 1 except: to the flask was initially added 85.0 grams of deionized water, 137.5 grams of maleic acid, 100.6 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 132.9 grams of 50% by weight aqueous sodium hydroxide; the initiator solution was prepared from 20.0 grams of sodium persulfate, 10.5 grams of deionized water and 75.0 grams of 50% by weight aqueous hydrogen peroxide; 10.0 grams of the initiator solution and 3.0 grams of 50% by weight aqueous hydrogen peroxide were added to the flask; and 32.5 grams of 23% by weight aqueous sodium metabisulfite were used.

The resultant polymer solution had a pH of 5.2 and a solids content of 50.6%. Based on GPC, the Mw was 1130 and the Mn was 811. The residual maleic acid content was 442 ppm and no residual cis-1,2,3,6-tetrahydrophthalic anhydride was detected.

EXAMPLE 10

The same procedure was followed as Example 1 except: to the flask was initially added 85.0 grams of deionized water, 125.0 grams of maleic acid, 111.8 grams of cis-1,2,3,6-tetrahydrophthalic anhydride, 6.0 grams of a 0.15% aqueous ferrous sulfate heptahydrate solution, 1.3 grams of a 0.15% aqueous copper sulfate pentahydrate solution and 130.40 grams of 50% by weight aqueous sodium hydroxide; the initiator solution was prepared from 20.0 grams of sodium persulfate, 10.5 grams of deionized water and 75.0 grams of 50% by weight aqueous hydrogen peroxide; and 32.5 grams of 23% by weight aqueous sodium metabisulfite were used.

The resultant polymer solution had a pH of 4.6 and a solids content of 51.9%. Based on GPC, the Mw was 633 and the Mn was 291. The residual maleic acid content was 35 ppm and the residual cis-1,2,3,6-tetrahydrophthalic anhydride was 417 ppm.

The data in Table I, below, are the weight percent of the total monomer of: cyclohexene anhydride, reported as "(a)", monoethylenically unsaturated monomers, reported as "(b)". The weight average molecular weight ($M_w$) and number average molecular weight ($M_n$) were determined by aqueous gel permeation chromatography using a poly(acrylic acid) standard.

TABLE I

| Example | (a) | (b) | $M_w$ | $M_n$ |
|---|---|---|---|---|
| 1 | 15 | 85 | 1890 | 1760 |
| 2 | 20 | 80 | 1810 | 1680 |
| 3 | 30 | 70 | 1520 | 1380 |
| 4 | 30 | 70 | 1660 | 1520 |
| 5 | 35 | 65 | 1270 | 1160 |
| 6 | 40 | 60 | 1220 | 1020 |
| 7 | 40 | 60 | 1320 | 1220 |
| 8 | 40 | 60 | 1620 | 1470 |
| 9 | 45 | 55 | 1130 | 811 |
| 10 | 50 | 50 | 633 | 291 |

WATER-TREATMENT EVALUATION

The polymers of the present invention are useful as water-treatment additives. To evaluate their effectiveness, polymer samples were analyzed in the following test.

CALCIUM CARBONATE (CaCO3) ANTI-PRECIPITATION TEST

Three stock solutions were prepared as follows:

1: Alkalinity solution: 2.14 grams NaHCO3 and 1.35 grams Na2CO3 were added to a volumetric flask and were diluted to a total volume of 2.00 liters with deionized water.

2. Hardness solution: 3.74 grams of CaCl2.2H2O and 1.53 grams of MgSO4 were added to a volumetric flask and were diluted to a total volume of 2.00 liters. To this solution was added 5 drops of 2N HCl.

3. Polymer or Phosphonate solutions: A polymer sample (or 2-phosphonobutane- 1, 2, 4-tricarboxylic acid) was diluted to 0.1 percent by weight solids with deionized water and the pH was adjusted to 5.0–6.0 with 1% by weight aqueous NaOH.

From the three stock solutions above were prepared:

1. A control solution of 50 milliliters (mls) of alkalinity solution and 50 mls of hardness solution.

2. A 100% inhibited solution of 50 mls of hardness solution and 50 mls of deionized water.

3. A test solution of 50 mls of alkalinity solution, 50 mls of hardness solution and 0.7 mls of polymer solution.

Into separate glass jars were added the control solution, the 100% inhibited solution and the test solution. The jars were placed in a constant temperature water bath set at 54° C. and allowed to stand for 20 hours. The jars were then removed from the water bath and the contents were immediately filtered through a 0.22 micron filter into another clean, dry jar. 40.0 grams of the filtered solution, 0.5 mls of 0.05N HCL and 0.1 grams of Calgon brand certified calcium indicating powder (catalog #R-5293) were added to an Ehrlenmeyer flask and titrated with Calgon brand certified hardness titrating solution 20 (catalog #R-5011). The percent CaCO3 inhibition was calculated as follows where each of the values is the number of milliters of titrating solution needed to reach the endpoint against the other solutions:

% CaCO3 inhibition =

$$100 \times \frac{\text{(test solution)} - \text{(control solution)}}{\text{(100\% inhibited solution)} - \text{(control solution)}}$$

The CaCO3 inhibition property of the polymer was measured in this manner and the data appear in Table II, below as the average of two results.

TABLE II

| Polymer of Example | % CaCO3 Inhibition | Standard Deviation |
|---|---|---|
| 3 | 66.1 | 2.56 |
| 4 | 63.9 | 0.78 |
| 5 | 67.7 | 4.95 |
| 6 | 59.3 | 13.15 |
| 7 | 69.1 | 5.51 |
| 8 | 66.9 | 1.41 |
| 9 | 63.2 | 2.33 |
| 10 | 56.7 | 11.88 |

The data in Table II show that the process of the present invention produces polymers which are useful water treatment additives and are effective for inhibiting calcium carbonate formation in an aqueous system.

CAUSTIC SOLUBILITY EVALUATION

The polymers of the present invention are useful in cleaning solutions containing high levels of caustic. Many cleaning solutions such as industrial bottle washing detergents, clean-in-place detergents, metal cleaning fluids, industrial and institutional laundry detergents contain high levels of caustic. Polymers are useful in these compositions as dispersants, sequestrants and anti-precipitants; however, many polymers cannot be used in these applications because they are not soluble. The polymers of the present invention show solubility in highly caustic solutions. The solubility in caustic solutions was evaluated in the following manner:

To a 25 mls glass vial was added 50 percent by weight aqueous sodium hydroxide. To the sodium hydroxide was added deionized water and polymer sample to yield a final concentration of 10 percent by weight polymer solids and 5, 10 or 30 percent by weight sodium hydroxide. The solution was stirred and allowed to stand before observations were made. In Table III, below, "insoluble" indicates that either a precipitate formed or phase separation was observed; "part. soluble" indicates that the solution was turbid but that no phase separation was observed; "soluble" indicates that no phase separation was observed and the solution was clear. The compositions reported in Table III, below, are the weight percent of the total monomer of: cyclohexene anhydride, reported as "(a)", monoethylenically unsaturated monomers, reported as "(b)"

TABLE III

| | Composition | | Caustic Level (percent by weight) | | |
|---|---|---|---|---|---|
| | (a) | (b) | 5 | 10 | 30 |
| Polymer of Example 7 | 40 | 60 | soluble | soluble | part. sol. |
| Comparatives | 65 | 35 | insoluble | insoluble | part. soluble |
| | 70 | 30 | insoluble | soluble | soluble |
| | 75 | 25 | insoluble | insoluble | insoluble |

The data in Table III show that the process of the present invention produces polymers which are at least partially soluble at a level of 10 percent by weight in concentrations of caustic of up to 30 percent. The comparatives examples were conducted using copolymers of acrylic acid as component (a) and maleic acid as component (b).

AUTOMATIC MACHINE DISHWASHING TESTING

The polymers of the present invention were evaluated as additives for automatic machine dishwashing detergents in the following manner.

Test Method

The dishwashing tests were performed using a modified version of A.S.T.M. method D 3556-85, Standard Test Method for Deposition on Glassware During Mechanical Dishwashing. This test method covers a procedure for measuring performance of household automatic dishwashing detergents in terms of the buildup of spots and film on glassware. Glass tumblers were given three cycles in a dishwasher, in the presence of food soils, and the levels of spotting and filming allowed by the detergents under test were compared visually.

A Kenmore brand dishwashing machine was used to perform the washing tests. The bottom rack of the dishwasher was randomly loaded with 14–18 dinner plates and the top rack was randomly loaded with several beakers and cups. Four new 10 ounce tumblers were placed randomly on the top racks as the test glasses. Soil used in the test was a 30 gram mixture of 80% Parkay brand margarine and 20% Carnation brand non-fat dry milk. The amount of soil used for each test was usually 40 grams for the first wash.

When a test was ready to be started, the desired amount of soil was smeared across the plates on the bottom rack, the detergent for the first cycle was placed in the detergent dispenser cup, and the machine was started. A normal cycle consisted of a wash, a rinse, a second wash, and two more rinses followed by a heat-drying cycle. At the beginning of the second wash, the machine was opened and a second detergent aliquot added. Soil was not added when a second detergent dose was added. Calgonit brand rinse aid (a product of Benckiser AG) was used at the recommended dosage in the rinse immediately following the second wash. The temperature of the supply water was maintained at 130° F. To the water supply was added calcium chloride and magnesium chloride in such amounts as to yield 400 ppm of hardness and a ratio of calcium ions to magnesium ions of 3:1 calculated as calcium carbonate. The machine was then allowed to complete the normal cycle including the drying time. This procedure was followed for a total of five complete cycles for each set of glasses.

When the final drying cycle was completed, the door was opened and the four glasses were removed and evaluated for filming and spotting. The test glasses were evaluated by placing them in a light box equipped with a fluorescent light. The glasses were ranked according to the following scale and the average rating for the four glasses is reported below in Table VI:

| Filming | | Spotting | |
|---|---|---|---|
| 0 | No film | 0 | No spots |
| 1 | Barely perceptible | 1 | Random |
| 2 | Slight | 2 | ¼ of glass |
| 3 | Moderate | 3 | ½ of glass |
| 4 | Heavy | 4 | Complete spotting |

Detergent Compositions Tested (by weight solids)

| DETERGENT COMPOSITION |
|---|
| 20% sodium carbonate |
| 20% BRITESIL ® H20 Polysilicate (SiO2:Na2O 2.0:1) |
| 10% sodium citrate.2H2O |
| 15% sodium perborate.4H2O |
| 0.5% enzyme (esperase) |
| 3% nonionic surfactant |
| 21.5% sodium sulfate |
| 5% polymer |

TABLE VI

| Polymer | Film Rating | Spot Rating |
|---|---|---|
| none | 2.0 | 0.0 |
| 1 | 0.0 | 0.0 |

The data appearing in Table VI show the benefit of the polymers prepared by the process of the present invention in an automatic machine dishwashing detergent.

We claim:

1. An aqueous process for preparing water-soluble polymers comprising: polymerizing a monomer mixture in the presence of water and one or more polymerization initiators at an elevated temperature, wherein the monomer mixture comprises
   (a) from about 3 to about 95 percent by weight of one or more cyclohexene anhydrides or the alkali metal or ammonium salts thereof; and
   (b) from about 5 to about 97 percent by weight of one or more monomers selected from the group consisting of $C_4$–$C_6$ monoethylenically unsaturated dicarboxylic acids and the alkali metal and ammonium salts thereof, and the anhydrides of the cis-dicarboxylic acids.

2. The process of claim 1 wherein the monomer mixture is present in a reactor and the initiator is fed into the reactor for 5 minutes to 5 hours.

3. The process of claim 1 wherein the elevated temperature is from about 25° C. to about 110° C.

4. The process of claim 1 wherein the monomer mixture is at least partially neutralized.

5. The process of claim 4 wherein the monomer mixture is at least partially neutralized with an aqueous sodium hydroxide solution.

6. The process of claim 1, wherein: the one or more cyclohexene anhydrides are selected from 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, and 2-methyl-1,3,6-tetrahydrophthalic anhydride.

7. The process of claim 1, wherein: the one or more cyclohexene anhydrides are selected from 1,2,3,6-tetrahydrophthalic anhydride, 5-norbornene-2,3-dicarboxylic anhydride, and 3,6-epoxy-1,2,3,6-tetrahydrophthalic anhydride and the alkali metal and ammonium salts thereof.

8. The process of claim 1 wherein (a) is present at from about 5 to about 90 percent by weight.

9. The process of claim 1 wherein (a) is present at from about 10 to about 85 percent by weight.

* * * * *